July 8, 1958 J. A. RODDER 2,842,351
QUARTZ FIBER TORSION ULTRAMICROBALANCE
Filed Aug. 11, 1955 3 Sheets-Sheet 1
FIG. 1.
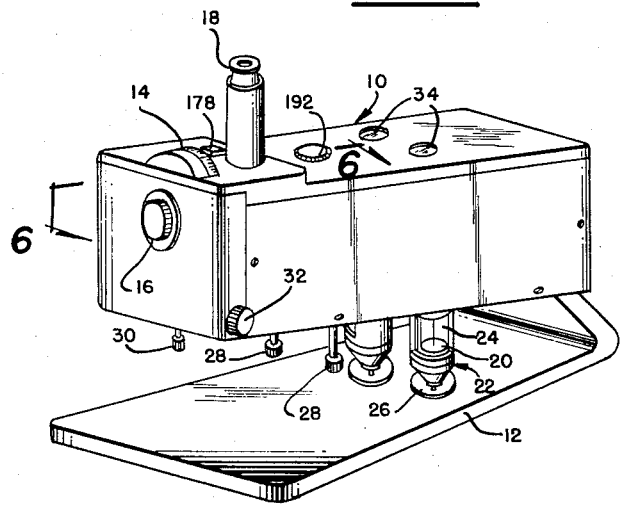
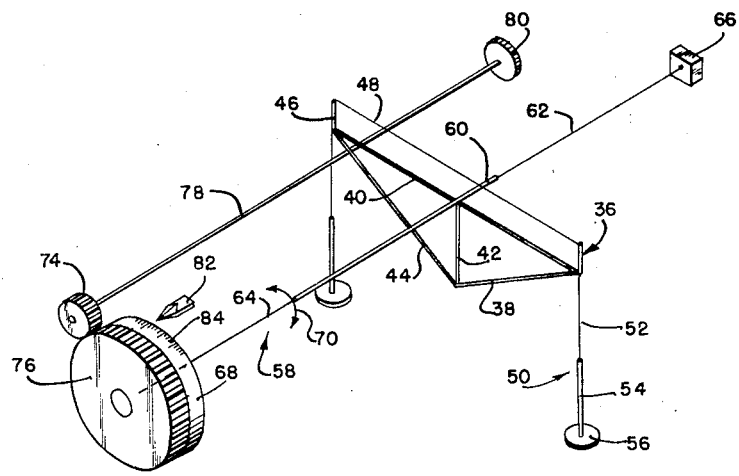
FIG. 2.
*Prior Art*
INVENTOR
JEROME A. RODDER
BY Munn, Liddy, Nathanson & Marsh
ATTORNEYS July 8, 1958 J. A. RODDER 2,842,351
QUARTZ FIBER TORSION ULTRAMICROBALANCE
Filed Aug. 11, 1955 3 Sheets-Sheet 2

INVENTOR

JEROME A. RODDER

BY *Munn, Liddy, Nathanson & March*
ATTORNEYS

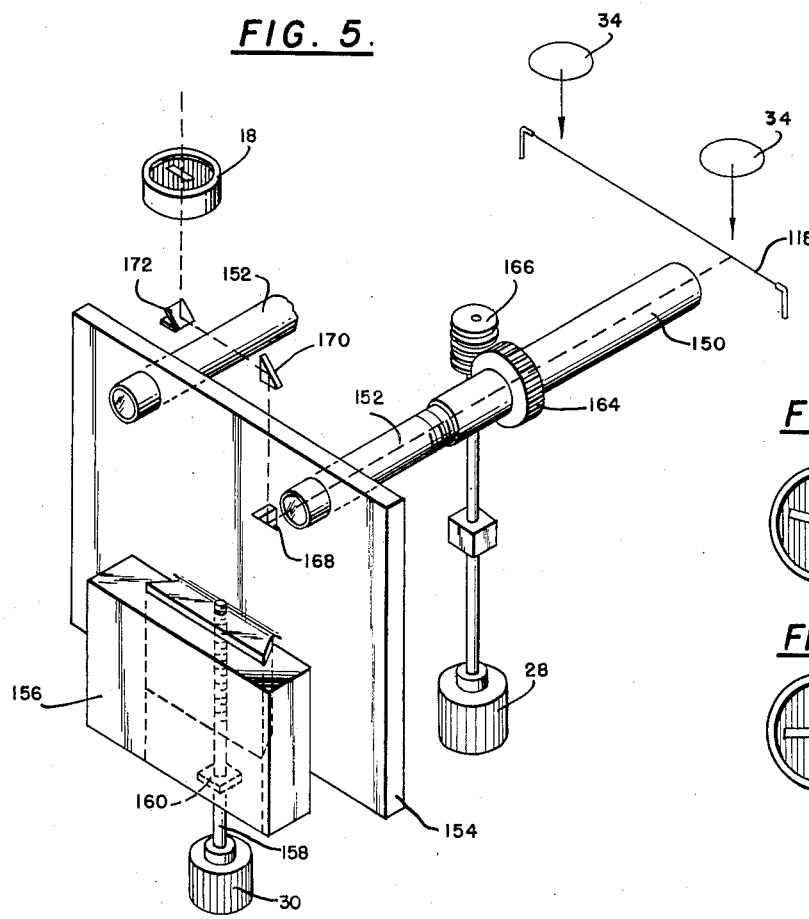

United States Patent Office 2,842,351
Patented July 8, 1958

2,842,351

QUARTZ FIBER TORSION ULTRAMICROBALANCE

Jerome A. Rodder, Berkeley, Calif.

Application August 11, 1955, Serial No. 527,834

5 Claims. (Cl. 265—54)

This invention relates to analytical balances and in particular to an ultramicrobalance for use in the precision weighing of microgram quantities. In recent years there have been developed balances for weighing extremely minute quantities. The sensitivity of these balances is apt to reach the order of ± 0.005 micrograms or less. The balances to which the present invention particularly relates comprise a quartz fiber to which a beam is attached. Weighing pans are suspended from the beam. The quartz fiber is twisted as the pans are loaded, and balance is achieved by turning the twisted fiber until the beam is in a null position. An optical system is employed to observe the position of the beam and when the beam has been brought back to the null point, after having been released with unequal weights on the pan, the amount of twist of the torsion fiber is read on an appropriate scale and added to the weights placed on the pan to give the total weight. The operation is somewhat similar to the older analytical balances.

As can be expected, balances of such sensitivity as heretofore constructed are extremely fragile. In fact with the balances heretofore known the slightest jar, such as bumping against the side of a table on which the balance is mounted, is often sufficient to break the beam system. They have heretofore been difficult to operate. They are subject to variable reading due to convection currents brought about by internal illuminating, etc., and otherwise constitute a delicate sensitive instrument which must be operated with extreme care. One of the difficulties with the prior known balances of this type is the limitation as to the amount of load which can be carried as well as the low shock resistance of the quartz fibers. Accordingly an object of my invention is to provide a quartz torsion beam balance which has a greater load capacity than heretofore possible and which has greater shock resistance as compared with the prior known balances.

Another object of my invention is to provide a balance of the type described which has extremely high accuracy combined with large load capacity.

It is also an object of my invention to provide a balance which is not subject to variable readings due to convection currents such as which may be caused by internal illumination.

A further object of the invention is to provide a balance of the type described which can be loaded and observed and adjusted while an operator is seated. With prior known devices this could not be done.

Yet another object of the invention is to provide an ultramicrobalance which has a short weighing time.

One of the objects of my invention is to provide an improved optical system for observing the position of the beam. According to the invention the optical system provides for easy adjustment of the elements forming parts thereof and makes it possible to more conveniently observe and adjust the beam. The operator using an instrument constructed in accordance with the present invention can load the pans, adjust the optical system and rotate the torsion fibers and take the necessary readings without changing position. This heretofore has been impossible.

The objects of the invention also include providing a satsfactory means of rotating the torsion fibers with which both a coarse and fine adjustment can be obtained. The word "coarse" is used in a relative sense only since all the adjustments made with the type of instrument herein disclosed are fine in the commonly accepted understanding of the word.

These and other objects and advantages will become apparent from the following description and the accompanying drawings in which:

Figure 1 is a perspective view illustrating a microbalance constructed in accordance with the invention.

Figure 2 is a perspective view illustrating the internal construction showing the torsion fiber and beam associated therewith as employed in the prior art.

Figure 5 is a fragmentary perspective view of an optical system constructed in accordance with the present invention.

Figure 6 is a sectional side elevational view with some portions exploded and is taken along line 6—6 of Fig. 1 illustrating the means for rotating the torsion fiber.

Figure 7 is a plan view illustrating the field of view on the eyepiece forming part of the optical system showing the beam out of null position.

Figure 8 is a plan view similar to Fig. 7 but showing the beam in null position.

Figure 3:
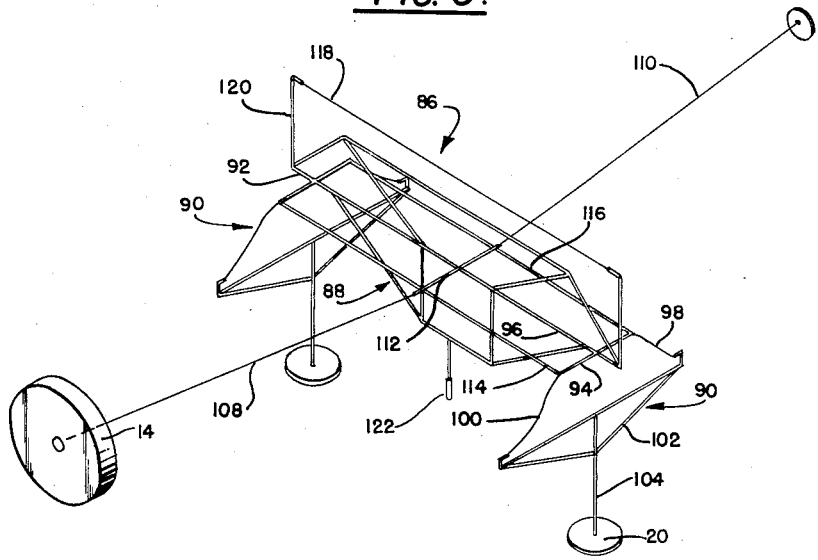
Figure 3 is a view similar to Fig. 2, but illustrating a beam system constructed in accordance with the invention.

Referring now in particular to the drawings a balance constructed in accordance with the invention comprises a housing 10 mounted on a stand 12. The torsion fiber beam and other portions of the apparatus are mounted in the housing. Often the exterior surfaces of the housing are light colored to reflect heat while the interior is black.

Scale 14 provides a means for reading the difference in weight on the balance pans. Knob 16 constitutes one means for rotating the scale. Eyepiece 18 is used to view a portion of the balance system, as hereinafter explained, to determine when the beam is balanced. Pans 20 are connected to the beam and are accessible from the exterior of the housing 10. The pans are received in tubular elements 22. The latter include inner and outer members with the outer member being rotatable on the inner member. Both of the members are provided with slots 24 which can be alined by rotation of one member on the other to expose the pans. Pan arrests 26 are also mounted in the tubular element 22. Knobs 28 and 30 are provided for the purpose of adjusting the optical system as hereinafter described and knob 32 forms a part of the torsion fiber rotating system hereinafter described. Windows 34 admit external light to the optical system. Stand 12 can be fastened to or merely rested on a table or other suitable support.

Figure 2 illustrates the internal construction of a balance beam system as heretofore constructed. Beam 36 comprises a truss like member 38 formed of horizontal quartz fiber 40, vertical fiber 42 and connecting fibers 44. These fibers are of a thickness of the order of .2 millimeters. Vertically upstanding members 46 are fixed at opposite ends of fiber 40. Members 46 support a fine fiber 48 which is substantially parallel to fiber 40. This fine fiber constitutes the index fiber and is of a thickness on the order of .04 millimeters. Hangdowns 50 are connected adjacent opposite ends of the beam and substantially equally spaced from the center. These hangdowns include fine fibers 52 which provide the knife edge like characteristics necessary and a relatively heavy fiber 54. Pans 56 are connected to fiber 54 in any convenient fashion. Quartz torsion fiber 58 is fused to beam 36. The later comprises a central or intermediate thick fiber 60 and forward and rear thin fibers 62, 64. One end of the torsion fiber is fixedly mounted in support 66. The other is fixedly mounted in indicator wheel 68. The main torsion fiber 58 rotates as indicated by arrow 70 and the hangdowns move vertically. The twisting of the torsion fiber 58 and the bending movement of the hangdowns is accomplished by the fine fibers forming parts thereof. The fine fibers 52 may be considered to be beams fixed at one end and subjected to transverse loads as well as a vertical tension. The indicator wheel 68 can be rotated through gears 74, 76, shaft 78 and knob 80. A vernier scale, or pointer, such as 82, can be used in association with suitable scale markings 84 on wheel 68.

In weighing a sample the following procedure is used:
(1) The sample is placed on one pan.
(2) Suitable tare weights are placed on the other pan.
(3) The pans are released by retracting the rests.
(4) The beam is rotated by rotation of the torsion fiber 58, until the beam is at its original null position. The position of the beam is observed through the eyepiece during the rotation after the beam is in null position.
(5) The scales can be read to determine the weight to be added to the tare weight. The amount to twist necessary to return the beam to the null position is directly proportional to the difference in loading on the beam pans.

As heretofore pointed out with the hangdowns and general beam construction illustrated in Fig. 2 the instrument is extremely sensitive to shocks.

Referring now to Fig. 3. In this figure I illustrate a torsion balance beam system constructed in accordance with the invention. The beam 86 comprises a main beam 88 and two secondary beams 90. The main beam is of truss-like formation and comprises a number of fibers 92 fused together. The secondary beams comprise truss-like members transversely disposed with respect to the main beam and are connected thereto by suspension fibers. The suspension fibers are connected to the secondary beams and to a thick fiber 94. Fiber 94 comprises the end member of the main beam and is positioned adjacent the end of the main beam. The construction at each end of the main beam is the same. The suspension fibers themselves comprise two fibrous members 98 and 100 which are relatively thin as compared to the members of the main and secondary beams. The suspension fibers extend outwardly and downwardly from the end member 94. Truss 102 is connected to the torsion fiber at points spaced laterally of the main beam. Truss 102 includes a vertical element 104 on which the pans 20 are mounted. In actual construction the pans are supported on pan holders as is known in the art.

The beam is suspended in the housing by means of torsion fiber 108 and suspension fiber 110. These are interconnected by central member 112. The torsion and suspension fibers are fine fibers capable of torsional displacement, whereas the central member 112, being much thicker and being fixed to the other portions of the main beam, will not twist. In other words, the relative size between the trosion fiber and suspension fiber and the central member is such that all twisting will occur in the fine fibers. It is to be noted that each set of suspension fibers and secondary beams lie in a vertical plane which is parallel to the vertical plane containing the torsion fiber 108. Further the suspension fibers 98 and 100 associated with each secondary beam are in non-parallel relationship with respect to each other within their common plane.

Central member 112 and thick fibers 94 constitute the central members of the torsion means (for the main beam and secondary beams) and they are interconnected by stringers 114 and 116 contributing to a rigid beam structure. The index fiber 118 is supported above the beam by upstanding legs 120.

With a beam constructed in accordance with the principles illustrated in Fig. 3 the hangdowns 104 are not subject to stress other than pure tension. The fine fibers 92 and 100 are placed in torsion by any side or eccentric loading of the secondary beams 90. This torsional load is of course distributed along the lengths of the fine fiber. In the older construction a concentrated load at one point would result from a shock for example. Also fibers 98 and 100 twist during normal loading and are placed under torsional load. In the older construction there is a bending movement placed on the hangdowns during normal movements of the beam.

Tab 122 is provided to lower the center of mass. As is well known it is necessary to have the center of mass below the center of rotation of the beam, otherwise the beam will be unstable. In the common analytical balances knife edges are used to support the pans on the beam so that there will be no change in the center of mass as the beam is loaded and rotates about its pivot. This principle is also involved in the construction of the quartz fiber balances described herein. In the balance illustrated in Fig. 2 the knife edges for the hangdowns find their equivalent in the fine fibers 52, whereas in the instant invention the knife edges find their equivalent in the elements 98 and 100. The main torsion and suspension fibers of course provide the knife edge for the main beam.

Figure 4:
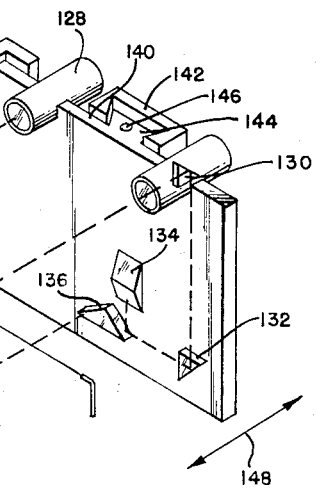
Figure 4 is a perspective view illustrating an older form of optical system.

Figure 4 illustrates an optical system, as previously employed.

Light sources 124 comprising small flash lights are supported in the housing 126. The light from these flash lights shines across the index fiber 48. Objectives 128 are positioned to receive the light and the shadows cast by index fiber 48. Prisms 130, 132, 134, 136 direct the light through a ground glass screen 138. Objective carrier 140 is vertically adjustable in slide 142. The latter has a T-slot cooperating with flange 144 affixed to carrier 140. A screw 146 is used to adjust the vertical position. Slide 142 is mounted for movement indicated by arrows 148.

Figure 5 illustrates the optical system which I have devised. According to my invention, exterior illumination, such as light from fluorescent tubes used in a laboratory, is admitted through windows 34, and strikes index fiber 118 from above. Light reflected from the side of index fiber 118 travels into objectives 150. The latter are threadingly connected to tubes 152 mounted in carrier 154. Carrier 154 is vertically adjustable in support 156. Screw 158 which is rotatably fixed to carrier 154 cooperates with nut 160 mounted in support 156 and knob 30 connected to screw 158 projects outside the case. By this means vertical adjustment of the carrier 154 and connected tubes 152 is possible. As the tubes move vertically the objectives 150 also move vertically.

Each of the objectives has a worm wheel 164 connected thereto. The latter cooperates with worm 166 which is attached to knob 28. By rotating worm 166 the objective 150 is rotated on threaded tube 152 and moved toward or away from the index fiber 118. Prisms 168 are mounted in carrier 154. Prisms 170 are mounted in the cover together with mirror 172. Through this means the reflected light is transmitted to the eyepiece 174.

From the above it is seen that there is individual adjustment of each of the objectives 150. In adjusting the optical system the carrier 154 is first moved to the desired location and then knobs 28 are operated to individually adjust the objectives. Wheels 164 will simply rotate on the worms as carrier 154 is adjusted vertically.

By using the light source exterior of the case the convection currents due to the interior illumination sources are eliminated. Further, with the optical system which I have devised it is not necessary to discern the shadow of the thin index fiber in the bright field presented on the ground glass. In my optical system the only light visible is that reflected from the index fiber. The rest of the field is dark. This is easier on the eyes and facilitates the use of the instrument.

Figure 6 illustrates means for twisting the torsion fiber as discussed heretofore. When the beam is released after having been loaded it will move out of null position. The fibers 108 and 110 are twisted as the beam moves out of position. In order to return the beam to the null position it is necessary to rotate fiber 108 applying a torsion load thereto until the index fiber 118 is again level. The means for accomplishing this result are illustrated in Figs. 1 and 6. Knob 16 is seen to be attached to shaft 176 and fiber 108 is fixedly connected to shaft 176 in any convenient manner. Thus, by rotating knob 116 fiber 108 is twisted. Scale 14 is also fixedly connected to shaft 176 and, of course, rotates. The latter cooperates with the vernier scale 178. Gear 180 is affixed to shaft 176 and cooperates with gear 182 connected to shaft 184. The latter is mounted in bearing block 186 fixedly connected to the housing. Worm 188 is fixed to shaft 184 and cooperates with a worm wheel fixed to shaft 190. The latter projects through the housing and has a revolution counter dial 192 affixed thereto. This cooperates with pointer 195 mounted on the housing 10. Thus, the revolutions of shaft 176 are counted. Scale 14 indicates the fractions of revolutions in any desired units. Coarse adjustment is obtained by rotating the shaft 176 by means of knob 16.

Shoulder 196 is fixedly connected to shaft 176. Friction plate 198 is slidably mounted on shaft 176 and backing plate 200 is similarly slidably mounted on shaft 176. Spring 202 cooperates with shoulder 204 to urge plate 200 and friction disc 198 against the shoulder 196. Backing plate 200 has a worm wheel 206 connected thereto which cooperates with worm 208 connected to knob 32. Shaft 176 can be frictionally driven by rotating knob 32. The friction drive is designed so that shaft 176 can be turned by rotating knob 16 without rotation of worm wheel 206.

The shaft which connects worm gear 206 with knob 32 is extended through both sides of the housing and a second knob 32 is provided on the side opposite that seen in Fig. 1. This provides operation with either the left or right hand. The rotation of the backing plate 200 will cause rotation of shaft 176 through the frictional drive. By proper selection of gears a desired fine drive for rotating shaft 176 is provided.

Figures 7 and 8 illustrate the images in the eyepiece 18. In the apparatus constructed in accordance with the present invention there is normally a dark field in the eyepiece and the light reflected from the index fiber 118 through the two objectives 150 forms two bright lines contrasting distinctly with the dark field. Figure 7 shows the light reflected from one side of the index fiber being below that from the other side indicating that the beam is not in null position. Figure 8 on the other hand indicates that the beam is in the null position.

While I have shown and described a preferred form of my invention, it will be understood that variations in details of form may be made without departure from the invention as defined in the appended claims.

I claim:

1. A torsion fiber microgram balance comprising a beam system, means for suspending said beam system including a torsion fiber, said beam system including a main beam and a secondary beam, said secondary beam being connected to said main beam and being laterally positioned with respect thereto, said secondary beam including means for supporting a pan, and a suspension fiber intermediate said last means and said main beam, means for twisting said torsion fiber comprising a shaft connected thereto, means forming a shoulder on said shaft, a friction disc movable on said shaft, a gear slidably mounted on said shaft, means urging said gear and said friction disc toward said shoulder and forming a frictional connection between said gear and said shoulder, and means for rotating said gear.

2. In a microgram balance comprising a torsion fiber, a main beam fixedly connected to said torsion fiber and extending laterally across said fiber, an end member adjacent each end of said main beam connected to said beam, said end members extending laterally of said main beam, means for suspending a load pan adjacent each end of said beam comprising a secondary beam at each of said ends of said main beam, each of said secondary beams comprising a truss-like member positioned beneath said main beam, a pair of suspension fibers connected to each of said truss-like members in spaced relationship and to the adjacent end members in spaced relationship, said suspension fibers suspending said truss-like members beneath said main beam, said truss-like members and their connected suspension fibers lying in a vertical plane generally parallel to the vertical plane containing said torsion fiber with the suspension fibers of each secondary beam being in non-parallel relation with respect to each other, said suspension fibers constituting the sole support for said secondary beams, the point of connection of said suspension fibers to said secondary beams being substantially below the points of connection of the latter fibers to said main beam, said suspension fibers being capable of free torsional deflection during operation of said balance.

3. In a microgram balance, a main beam, said main beam including a central member extending generally horizontally, a torsion fiber connected to one end of said central member, a suspension fiber connected to the opposite end of said central member, said main beam being supported by said torsion fiber and said suspension fiber, a pair of rigid end members connected adjacent each end of said beam and extending laterally thereof parallel to said central member, a secondary beam suspended from each of said rigid end members, each of said secondary beams comprising a rigid truss-like member, a pan supported vertically from each of the latter members, and means for supporting each of said truss-like members from said main beam comprising a pair of suspension fibers, one of said suspension fibers being connected adjacent one end of said secondary beam, the other of said suspension fibers being connected adjacent the opposite end of said secondary beam, each of said suspension fibers being fixedly connected to the adjacent end member, the latter suspension fibers suspending said secondary beams beneath said end members, the suspension fibers connected to each respective secondary beam, and end member lying in non-parallel relationship in a vertical plane generally parallel to the vertical plane containing said torsion fiber.

4. In a microgram balance comprising a torsion fiber, a main beam fixedly connected to said torsion fiber and extending laterally across said fiber, means for suspending a load pan on each end of said beam comprising a secondary beam at each of said ends of said main beam, each of said secondary beams comprising a truss-like member positioned beneath said main beam, a pair of spaced suspension fibers connected to each of said truss-like members and to said main beam and suspending said truss-like members beneath said main beam, said truss-like members and their connected suspension fibers lying in a vertical plane generally parallel to the vertical plane containing said torsion fiber with the suspension fibers of each secondary beam being in non-parallel relation with respect to each other, the point of connection of the suspension fibers to said secondary beams being substantially below the point of connection of the latter fibers to said main beam, said suspension fibers being capable of free torsional deflection during operation of said balance.

5. The apparatus of claim 4 including an index fiber connected to said main beam and extending substantially horizontally parallel to said main beam, means for directing light in a first direction laterally against said index fiber, said fiber being adapted to direct at least a portion of said light laterally of said first direction, an optical system for observing said index fiber comprising means for accepting only the portion of said light imposed against said index fiber which is directed by said fiber laterally of said first direction, said optical system including means for visually inspecting the light so directed by said index fiber.

References Cited in the file of this patent

UNITED STATES PATENTS

| | | |
|---|---|---|
| 262,905 | Roeder | Aug. 15, 1882 |
| 262,906 | Roeder | Aug. 15, 1882 |
| 340,010 | Springer | Apr. 13, 1886 |
| 2,417,392 | Craig et al. | Mar. 11, 1947 |
| 2,624,564 | Carmichael | Jan. 6, 1953 |
| 2,694,566 | Wolter | Nov. 16, 1954 |
| 2,715,353 | Kuhnle | Aug. 16, 1955 |
| 2,731,880 | Beeson | Jan. 24, 1956 |